Nov. 29, 1960 D. SEMEL 2,962,661

DEMODULATOR-MODULATOR

Filed July 11, 1957 2 Sheets-Sheet 1

INVENTOR.
David Semel

BY [signature]
Attorney

Nov. 29, 1960 D. SEMEL 2,962,661

DEMODULATOR-MODULATOR

Filed July 11, 1957 2 Sheets-Sheet 2

INVENTOR.
David Semel
BY
Edward M. Kendrick
Attorney

United States Patent Office 2,962,661
Patented Nov. 29, 1960

2,962,661

DEMODULATOR-MODULATOR

David Semel, Los Angeles, Calif., assignor to Gilfillan Bros., Inc., Los Angeles, Calif., a corporation of California Filed July 11, 1957, Ser. No. 671,159

4 Claims. (Cl. 328—31)

This invention relates to servomechanisms, and more particularly to follow-up systems in which a carrier signal is modulated and then demodulated according to the sense of an error and the modulation envelope corrected by a D.C., i.e., direct-coupled or direct-current compensation network for various other errors, such as errors in its phase, or the like.

A D.C. compensation network is generally preferred over transformer coupled or capacitor coupled, or other A.C. coupled compensation networks, because a D.C. compensation network is not sensitive to carrier frequency shifts. The modulator and demodulator must, of course, be provided in a servo utilizing a carrier modulated signal in order to incorporate a D.C. compensation network therein. However, conventional electronic or mechanical modulators and demodulators both involve the use of a considerable amount of expensive equipment.

It is, therefore, an object of the invention to provide a demodulator-modulator to be used in conjunction with a D.C. compensation network in a follow-up system.

It is another object of the invention to provide a demodulator-modulator requiring relatively few inexpensive component parts.

This and other objects and advantages of the invention are achieved and the above-described disadvantages of the prior art overcome by providing an improved demoulator-modulator for use with a D.C. compensation network in a follow-up system to produce a carrier-modulated servo control signal in response to an error signal modulated carrier. The demodulator-modulator includes a filter to pass only the modulation envelope of the error signal modulated carrier to the input of the D.C. compensation network. Means are then provided to clamp alternately the input of the filter and the output of the D.C. compensation network to zero or ground potential, i.e., in effect to gate an input signal to the filter and alternately gate an output signal from the D.C. compensation network.

The filter of course generally will be a simple low-pass filter to pass the modulation envelope of the error signal modulator carrier. The clamping means may be constructed in an extremely simple manner in accordance with a special feature of the invention. Specifically, a chopper, well known in the electronic art, including a pivoted arm is employed. The pivoted arm is connected to ground potential and a first stationary terminal is connected to the input to the filter and a second stationary terminal is connected to the output of the D.C. compensation network. The chopper is also provided with an operating winding adapted to be energized by current flow in opposite directions to move the pivoted arm alternately in contact with the first and second stationary terminals. Thus, when an alternating signal of the carrier frequency of the system is employed to energize the operating winding, the chopper serves as a modulator and demodulator combined.

It is thus evident that the invention may be constructed of relatively few inexpensive component parts.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Figure 1:
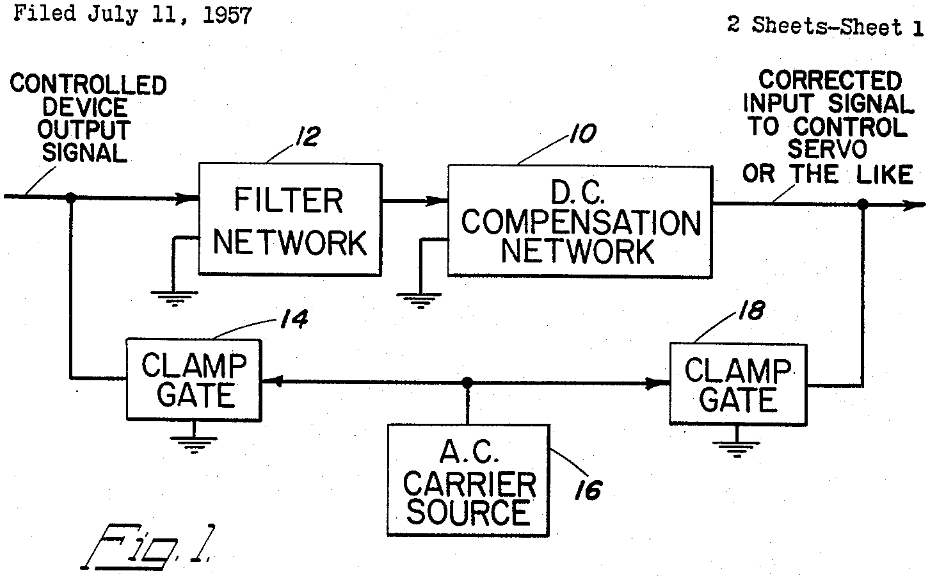
Fig. 1 is a block diagram of one embodiment of the invention.

In Fig. 1 a D.C. compensation network is indicated at 10. The D.C. compensation network 10 is inserted between the output of a control device, not shown, and an input to a control servo for the output device. The output signal of the output device is impressed simultaneously on a filter network 12 and a first clamp gate 14. Clamp gate 14 is operated by an A.C. carrier source 16 which clamps the input of filter network 12 to ground when the output of A.C. carrier source 16 is of one polarity. When the output of A.C. carrier source 16 is another polarity, the output of D.C. compensation network 10 is clamped to ground by means of a second clamp gate 18, which is also operated by A.C. carrier source 16. Thus, the operation of clamp gate 14 synchronously with clamp gate 18 provides an unusual demodulator-modulator providing, in addition to a simple demodulated signal, an output signal with a carrier frequency corresponding to the output signal of the A.C. carrier source 16. That is, the envelope of a carrier modulated signal detected by clamp gate 14 is operated on by filter network 12 and D.C. compensation network 10. The output of the D.C. compensation network 10, modulated by clamp gate 18, is a carrier modulated signal of the same frequency as A.C. carrier source 16.

Figure 2:
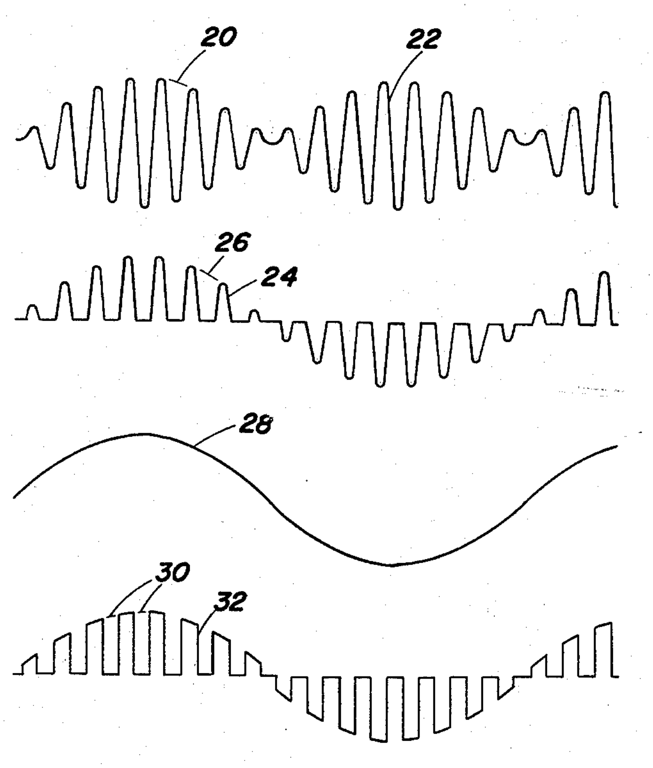
Fig. 2 is a graph of a group of waveforms characteristic of the operation of the invention shown in Fig. 1.

Operation of this embodiment of the invention shown in Fig. 1 will be better understood when considered in connection with the waveforms shown in Fig. 2. A modulated carrier envelope is indicated at 20 in Fig. 2. The carrier itself is indicated at 22. When demodulated by clamp gate 14, the input to filter network 12 will appear as 24 having envelope 26 of the proper phase representing the sense of the error of the output signal of the controlled device with which this system is associated. The envelope of the input 24 to filter network 12 is smoothed and applied as an error output signal to D.C. compensation network 10. Filter 12, of course, may be any conventional type of smoothing network or low pass filter. This is indicated by waveform 28 in Fig. 2. The output of D.C. compensation network 10 would normally be the waveform 28 and perhaps shifted in phase if such a compensation is necessary. In other words, D.C. compensation network 10 may simply be a phase shifter. No such shift is shown in the waveforms illustrated in Fig. 2. However, the output of D.C. compensation network 10 is clamped to ground at the frequency of A.C. carrier source 16. Hence, a typical envelope of the output of D.C. compensation network 10 may be illustrated as at 30; however, the instantaneous output signal amplitude of D.C. compensation network 10 will be as indicated at 32 in Fig. 2.

Figure 3:
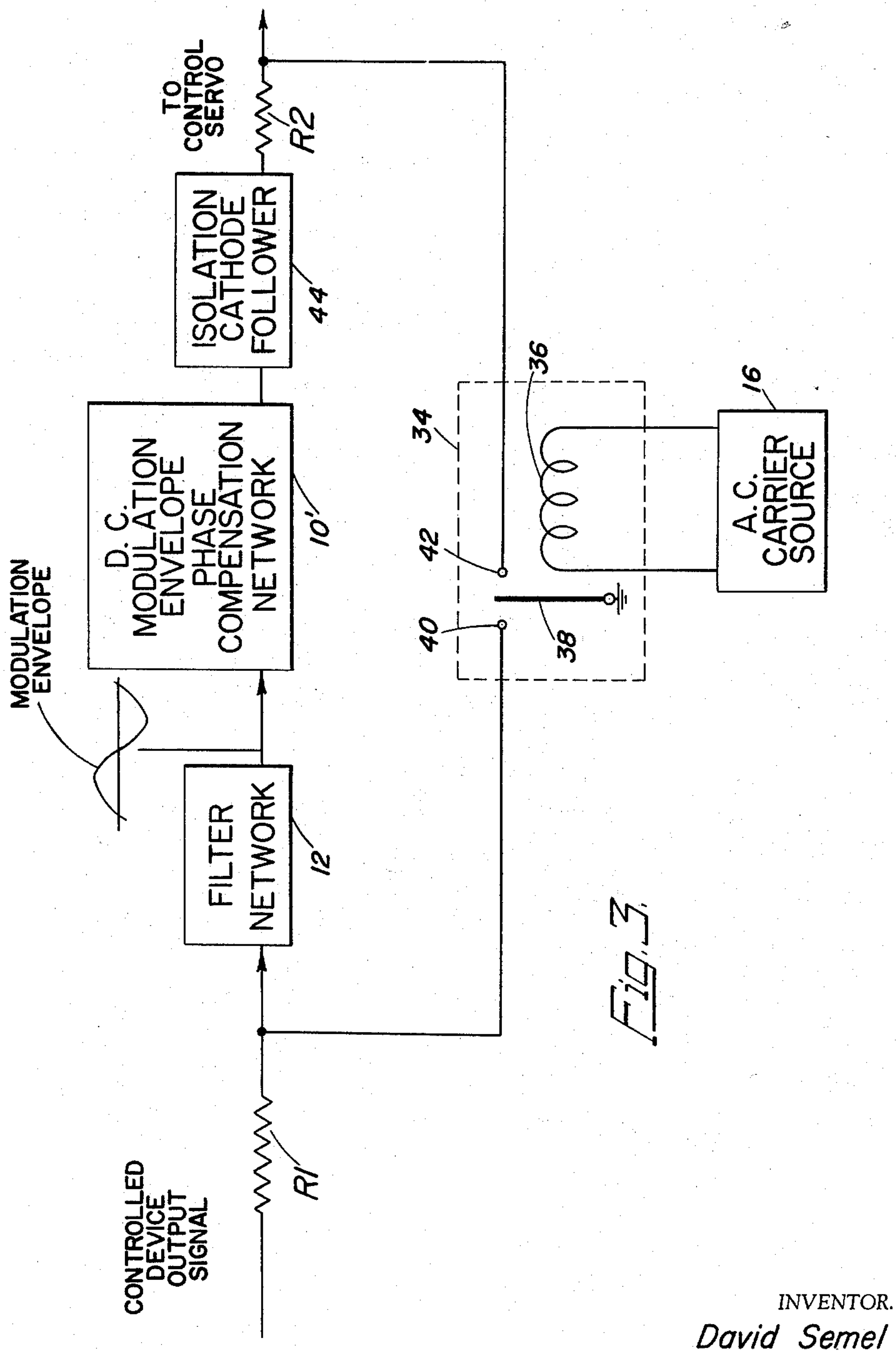
Fig. 3 is a schematic diagram of a specific form of the invention shown in Fig. 1.

In view of the fact that the input to filter network 12 is clamped to ground alternately with the output of D.C. compensation network 10, it is obvious that preferably a resistor, such as a resistor R1 shown in Fig. 3, should be provided as a serial connection with the filter network and whatever gating means are employed, that is gating means 34 in Fig. 3, in order to prevent high current loading of the output of the controlled device with which the system is associated.

In Fig. 3, D.C. compensation network is specifically indicated as a D.C. modulation envelope phase composition network 10'. An isolation cathode follower 44 is directly connected from phase compensation network 10'. However, the isolation cathode follower 44 may be entirely eliminated in some cases, and in others may be considered as a composite part of phase compensation network 10'. It is to be noted that a resistor R2 is also connected from the output of cathode follower 44 in order to prevent undue loading of its output circuit. However, it is to be noted that resistor R1 itself may be contained in the output circuit of the control device. Similarly, resistor R2 may itself be included in the output circuit of phase compensation network 10'.

According to a special feature of the invention, special gating means 34 which is a chopper is preferably employed in conjunction with A.C. carrier source 16 to clamp the input to filter network 12 and the output of phase compensation network 10' alternately to ground potential. At this point, it may be pertinent to note that the output of A.C. carrier source 16 need not be a sinusoidal output and may be a square wave output. All that is necessary is that it alternately pass current through an operating winding 36 in chopper 34 in reverse directions to move a pivoted arm 38 in chopper 34 alternately against a first terminal 40 and a second terminal 42. It is to be noted that pivoted arm 38 is connected to ground. Hence, the input to filter network 12 and the output of phase compensation network 10' must then be alternately clamped to ground as chopper 34 is operated. However, although the chopper 34 provides an extremely simple modulation and demodulation device, it is to be noted that clamp gates 14 and 18 may be diodes, or other similar electronic gates, rather than the electromechanical gates provided by mechanical and electrical component parts of the chopper 34.

Although only one specific embodiment of the invention has been shown and described, it is to be understood that this embodiment has been shown merely for purposes of illustration and the true scope of the invention is by no means limited thereto, but is defined only in the appended claims.

What is claimed is:

1. A combined demodulator-modulator for connection between the output of a controlled device and the input to a servo to control said device, said demodulator-modulator comprising: a filter; a compensation network connected from the output of said filter to modify a characteristic of the filter output signal; and means to clamp alternately the input of said filter and the output of said network to a point of fixed reference potential, said filter being adapted to reject alternating signals of the frequency of alternation of said clamp means but to pass signals of frequencies lower than the frequency of alternation of said clamp means.

2. A combined demodulator-modulator for connection between the output of a controlled device and the input of a servo to control said device, said demodulator-modulator comprising: a filter; a compensation network connected from the output of said filter to modify a characteristic of the filter output signal; and means to clamp alternately the input of said filter and the output of said network directly to ground potential, said filter being adapted to reject alternating signals of the frequency of alternation of said clamp means but to pass signals of frequencies lower than the frequency of alternation of said clamp means.

3. A combined demodulator-modulator for connection between the output of a controlled device and the input of a servo to control said device, said demodulator-modulator comprising: a filter, a phase shifter connected from the output of said filter; and means to clamp alternately the input to said filter and the output of said phase shifter to a point of fixed reference potential, said filter being adapted to reject alternating signals of the frequency of alternation of said clamp means but to pass signals of frequencies lower than the frequency of alternation of said clamp means.

4. A combined demodulator-modulator for connection between the output of a controlled device and the input of a servo to control said device, said demodulator-modulator comprising: a filter; and means to clamp alternately the input to said filter and the output of said phase shifter directly to ground, said filter being adapted to reject alternating signals of the frequency of alternation of said clamp means but to pass signals of lower frequencies than the frequency of alternation of said clamp means.

References Cited in the file of this patent

UNITED STATES PATENTS

| | | |
|---|---|---|
| 2,685,000 | Vance | July 27, 1954 |
| 2,795,653 | McCoy | June 11, 1957 |
| 2,801,296 | Blecher | July 30, 1957 |

UNITED STATES PATENT OFFICE

CERTIFICATION OF CORRECTION

Patent No. 2,962,661 November 29, 1960

David Semel

It is hereby certified that error appears in the above numbered patent requiring correction and that the said Letters Patent should read as corrected below.

Column 4, line 36, after "filter;" insert -- a phase shifter connected from the output of said filter --.

Signed and sealed this 13th day of June 1961.

(SEAL)
Attest:

ERNEST W. SWIDER
Attesting Officer

DAVID L. LADD
Commissioner of Patents